United States Patent [19]

Barrett

[11] Patent Number: 5,338,599

[45] Date of Patent: Aug. 16, 1994

[54] VIBRATION-DAMPING STRUCTURAL COMPONENT

[75] Inventor: David J. Barrett, Erdenheim, Pa.

[73] Assignee: The United States of America as represented by the Secretary of the Navy, Washington, D.C.

[21] Appl. No.: 800,902

[22] Filed: Nov. 26, 1991

[51] Int. Cl.$^5$ ............................................... B32B 7/02
[52] U.S. Cl. ................................... 428/212; 248/636; 248/638; 248/901; 428/213; 428/217; 428/218; 428/316.6; 428/461
[58] Field of Search .............. 428/600, 626, 636, 659, 428/461, 156, 212, 213, 217, 218, 316.6; 29/904, DIG. 46; 248/560, 562, 636, 638, 901

[56] References Cited

U.S. PATENT DOCUMENTS

| | | | |
|---|---|---|---|
| 3,143,457 | 8/1964 | Morris | 428/217 X |
| 3,562,089 | 2/1971 | Warnaka et al. | 428/217 |
| 4,678,707 | 7/1987 | Shinozaki et al. | 428/323 |
| 4,740,427 | 4/1988 | Ochiumi et al. | 428/463 |
| 4,778,028 | 10/1988 | Staley | 181/208 |
| 4,851,271 | 7/1989 | Moore, III et al. | 428/34.5 |
| 5,063,098 | 11/1991 | Niwa et al. | 428/76 |

OTHER PUBLICATIONS

Practical Stand Off Damping Treatment for Sheet Metal.

*Primary Examiner*—Paul J. Thibodeau
*Assistant Examiner*—H. Thi Le
*Attorney, Agent, or Firm*—James V. Tura; James B. Bechtel; Susan E. Verona

[57] ABSTRACT

A laminated structural component with superior resistance to flexural vibrations is provided comprising two load-bearing layers and a viscoelastic damping layer sandwiched therebetween. Each of the load-bearing layers comprises an outer stiffness sublayer and an inner compliant sublayer, the compliant sublayer being positioned between the outer stiffness sublayer and the viscoelastic damping layer. The compliant sublayers have an extensional elastic modulus which is less than that of the stiffness sublayers, and greater than that of the viscoelastic damping layer. The laminated structural component experiences greater relative in-plane displacements between the load-bearing layers, and preserves transverse static stiffness.

5 Claims, No Drawings

VIBRATION-DAMPING STRUCTURAL COMPONENT

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

The present invention relates generally to vibration-damping structural components, and more particularly to such components which have improved resistance to flexural modes of vibration.

Various load-bearing systems and structures, such as aircraft, experience vibrations during use which cause them to suffer from high cyclic and resonant fatigue and reduced service life. Devices for reducing such vibrations combine alternating layers of stiffness and damping materials in a single composite. Under bending or flexural loads, the stiffness layers deform, shearing the damping layers, which, because of their viscosity, convert the shear strain energy into heat, thereby dissipating the vibrational energy. In vibrational environments structures employing these composites have operational characteristics, durability, and service life that far exceed those of components based solely on stiffness materials. In some cases, these layered composites are fixed to the surface of a pre-existing base structure subject to vibrations. The damping layer is generally bonded to the base structure itself and a constraining cover layer of stiffness material is bonded to the damping layer. Another such device includes an additional stand-off layer between the base structure and the damping layer to remove the damping layer further from the neutral axis, which is within the base structure. The stand-off layer, which has a discontinuous surface interfacing the damping layer, stretches and therefore shears the damping layer on its interfacing surface. The constraining stiffness layer is bonded directly to the damping layer.

In other cases, the structure itself is made of a vibration-damping layered composite. An example of such a composite structure is a planar lamination of stiffness and damping layers such as a sandwich construction, which has two load-bearing layers of stiffness material and a layer of viscoelastic damping material sandwiched therebetween. Attempts are on-going to increase the damping capability of these sandwich constructions by increasing the rate or amount of shear straining in the damping layer thereof. In some applications, such as in aircraft, weight is a factor in the design of these components as well.

SUMMARY OF THE INVENTION

It is therefore an object of the present invention to provide a structural component with increased resistance to vibratory loads.

It is another object to provide a laminated structural component which experiences a greater rate of shear strain in the damping layer thereof.

It is still another object to provide a structural component which optimizes damping capability and weight.

The present invention provides a laminated structural component that resists or damps flexural or bending vibrations. The component may be incorporated into beam or plate structures. The structural component comprises a viscoelastic damping layer bonded between two load-bearing layers. Each of the load-bearing layers comprises an outer stiffness sublayer and an inner compliant sublayer, the inner compliant sublayer being positioned between the viscoelastic damping layer and the outer stiffness sublayer. The compliant sublayers have an extensional elastic modulus which is less than that of the stiffness sublayers and greater than that of the viscoelastic damping layer. The extensional elastic modulus of each load-bearing layer is therefore not constant across the thickness thereof. The load-bearing layers are less stiff adjacent to the viscoelastic damping layer, causing greater relative in-plane displacements between the two load-bearing layers under cyclic vibration than if the layers adjacent to the viscoelastic layer were stiffer. This increases the rate of shearing in the viscoelastic damping layer, which leads to higher levels of energy dissipation. The load-bearing layers have greater stiffness on the outside thereof, putting the stiffer material further from the neutral axis. This preserves the transverse static stiffness, another factor which contributes to good damping capability. The overall thickness of the component can be the same as that of prior art sandwich structures which use the same stiffness material. Essentially, a given thickness of the stiffness layer of the prior art sandwich structure can be replaced with an equal thickness of the less-stiff compliant sublayer at the interface with the viscoelastic damping layer. This is because the strength requirement of the prior art sandwich structure was determined assuming a given level of vibration, and the thickness thereof was sized accordingly. Since the structural component of the present invention damps more of the vibration, less strength and therefore less stiffness material is required. Since the less-stiff compliant materials are generally less massive than stiffness materials, the overall weight of the structural component is generally less than that of the prior art device of the same thickness. Because the laminated structural component of the present invention increases damping without increasing weight, it is ideal for use in aircraft structures.

Other objects, advantages and novel features of the invention will become apparent from the following detailed description of the invention.

DESCRIPTION OF THE PREFERRED EMBODIMENT

A laminated structural component with superior resistance to flexural vibrations is provided comprising two load-bearing layers and a viscoelastic damping layer sandwiched therebetween. Each of the load-bearing layers comprises an outer stiffness sublayer and an inner compliant sublayer, the inner compliant layer being positioned between the outer stiffness sublayer and the viscoelastic damping layer, the inner compliant sublayer having an extensional elastic modulus which is less than that of the outer stiffness sublayer, and greater than that of the viscoelastic damping layer.

The viscoelastic damping layer forms the core of the laminated structural component. The selection of a particular viscoelastic material for the damping layer is based on standard design considerations known to those skilled in the art, such as damping capacity and useful temperature and frequency ranges. Examples of appropriate viscoelastic materials are adhesives such as acrylic polymers, elastomers, polymerics, and thermoplastics. An anchoring layer may be incorporated as part of the viscoelastic damping layer for improved bonding to the load-bearing layers. The appropriate thickness of the viscoelastic damping layer is also selected according to standard design considerations on a case-by-case basis.

The strength requirements of the particular application and the following guidelines will dictate the materials for and the thicknesses of the outer stiffness sublayers and the inner compliant sublayers. The thickness of each of the compliant sublayers should be between 15 and 30 percent of the overall thickness of one of the load-bearing layers. The extensional elastic modulus of the compliant sublayers should be at least 25 percent less than the extensional elastic modulus of the stiffness sublayers and at least 10 times greater than the extensional elastic modulus of the viscoelastic damping layer. The rate of shearing of the viscoelastic damping layer will increase as the extensional elastic modulus of the compliant sublayers is reduced. The shear elastic modulus of the compliant sublayers should be at least 10 times greater than the shear elastic modulus of the viscoelastic damping layer, to insure that shearing is confined to the damping layer. The mass density of the compliant sublayers should preferably be less than that of the stiffness sublayers. The compliant sublayers may be bonded to the stiffness sublayers by any convenient means, including adhesion.

Appropriate materials for the stiffness sublayers include metals, wood, plastics, ceramics, and concrete. For beam applications, the stiffness sublayers can be made of an orthotropic material positioned with the preferred stiffness direction parallel with the principle bending axis. The compliant sublayers in such a situation can be the same material as used for the stiffness sublayers, but with the preferred stiffness direction at an angle with respect to that of the stiffness sublayers, thereby giving the compliant sublayers a lower stiffness in the direction of the principle bending axis.

In another embodiment, the compliant sublayer is made of the same material as the stiffness sublayer, but it has a uniform pattern of voids or removed material throughout the sublayer, giving it its lower extensional elastic modulus. This uniform pattern of removed material can be formed by providing a layer of stiffness material having a thickness equal to the desired thickness of the entire load-bearing layer, and then treating the surface thereof which will interface with the viscoelastic damping layer to remove material therefrom to a depth equal to the desired thickness of the inner compliant sublayer. The material is removed to form a replicating pattern, such as a waffle pattern, on the remaining inner surface. Other treatments, such as scoring and grooving, can be used to achieve the same effect.

A comparison of the laminated structural component of the present invention to a prior art structure will demonstrate the improved damping capability offered by the invention. The component according to the invention is in the form of 24-inch plate comprising 0.030-inch-thick load-bearing layers sandwiching a 0.002-inch-thick viscoelastic layer of a cross-linked acrylic copolymer adhesive known as ISD-112, manufactured by 3M Company. The inner compliant sublayers are 0.005-inch-thick aluminum sheets, and the stiffness sublayers are 0.025-inch-thick steel sheets. The prior art structure is the same, except that the 0.030-inch-thick load-bearing layers are all steel.

The following Table shows the level of improvement in damping capability achieved by substituting the compliant aluminum sublayer for some of the stiffness material of the prior art structure. The loss factors were computed using the Mead's Forced Mode Method.

TABLE

| Vibrational Mode | Loss Factor of Prior Art Structure | Loss Factor of Component According to the Invention | % Improvement |
| --- | --- | --- | --- |
| 1 | .0409 | .0415 | 01 |
| 2 | .1580 | .1680 | 06 |
| 3 | .2417 | .2668 | 10 |
| 4 | .2905 | .3323 | 14 |
| 5 | .3167 | .3730 | 18 |
| 6 | .3286 | .3965 | 21 |
| 7 | .3321 | .4069 | 23 |
| 8 | .3305 | .4139 | 25 |
| 9 | .3263 | .4143 | 27 |
| 10 | .3202 | .4114 | 28 |

The component of the invention is also 12% lighter than the prior art structure.

Some of the many advantages and novel features of the invention should now be readily apparent. For instance, a laminated structural component has been provided which has superior resistance to flexural vibrations. Such a component has been provided without significantly sacrificing strength and at a reduction in total structural weight.

Those skilled in the art will appreciate that other embodiments and modifications of the present invention are possible, and are intended to be included within the scope of the following claims.

What is claimed is:

1. A laminated structural component with superior resistance to flexural vibrations, comprising:
   a viscoelastic damping layer; and
   two load-bearing layers bonded to said viscoelastic damping layer to sandwich said damping layer therebetween, each of said load-bearing layers comprising an outer stiffness sublayer and an inner compliant sublayer, said inner compliant sublayer being positioned between said outer stiffness sublayer and said viscoelastic damping layer, and said inner compliant sublayer having an extensional elastic modulus which is at least 25 percent less than that of said outer stiffness sublayer and at least ten times greater than that of said viscoelastic damping layer and having a shear elastic modulus which is at least ten times greater than that of said viscoelastic damping layer, and the thickness of said compliant sublayer being 15 to 30 percent of the thickness of one of said load-bearing layers.

2. The laminated structural component of claim 1 wherein the mass density of said compliant sublayers is less than that of said stiffness sublayers.

3. The laminated structural component of claim 1 wherein said compliant sublayers are adhesively bonded to said stiffness sublayers.

4. The laminated structural component of claim 1 wherein said stiffness sublayers are steel, said damping layer is an acrylic co-polymer adhesive, and said compliant sublayers are aluminum.

5. The laminated structural component of claim 1 wherein said compliant sublayers are the same material as said stiffness sublayers, said compliant sublayers having voids therein to reduce the extensional elastic modulus thereof.

* * * * *